United States Patent [19]

Abbott

[11] 3,769,522

[45] Oct. 30, 1973

[54] APPARATUS AND METHOD FOR CONVERTING MOS CIRCUIT SIGNALS TO TTL CIRCUIT SIGNALS

[75] Inventor: Warwick R. Abbott, Woburn, Mass.

[73] Assignee: Honeywell Information Systems Inc., Waltham, Mass.

[22] Filed: Jan. 18, 1972

[21] Appl. No.: 218,793

[52] U.S. Cl. .................. 307/203, 307/207, 307/208, 307/238

[51] Int. Cl. ........................ H03k 19/00, H03k 19/08

[58] Field of Search ..................... 307/208, 238, 203, 307/207, 264; 340/172.5

[56] References Cited

UNITED STATES PATENTS

| | | | |
|---|---|---|---|
| 3,538,349 | 11/1970 | Smith | 307/238 |
| 3,487,376 | 12/1969 | Hart, Jr. | 307/238 X |
| 3,684,897 | 8/1972 | Anderson et al. | 307/238 X |

*Primary Examiner*—John Zazworsky
*Attorney*—Nicholas Prasinos et al.

[57] ABSTRACT

A converter circuit for transferring binary information stored in a metal-oxide-semiconductor (MOS) field effect transistor (FET) memory cell array to conventional transistor-transistor-logic (TTL) circuits. The circuit converts the signals available at the output of a MOSFET memory array into signals suitable for manipulation by TTL circuits. The accurate transfer of stored information is facilitated by an external strobe signal, which activates the converter circuit during a relatively noise-free period of the MOSFET memory. A network is provided for maintaining the output signal of the MOSFET memory at the output of the converter circuit. Another network, responsive to an external signal provides a method of clearing the maintained binary signal in preparation for a period of further activity of the converter circuit. A network for electrically isolating the converter circuit from the output terminal is provided.

16 Claims, 3 Drawing Figures

APPARATUS AND METHOD FOR CONVERTING MOS CIRCUIT SIGNALS TO TTL CIRCUIT SIGNALS

BACKGROUND OF THE INVENTION

The use of metal-oxide-semiconductor (MOS) field-effect transistor (FET) memory arrays in association with data processing units, is currently being implemented. The integration of MOSFET memory arrays in the data processing unit presents problems peculiar to that type of memory.

The most serious problem of the MOSFET type memories is the presence of refreshing and addressing signals on the memory array which provide a noise source in the memory array. In order to discriminate against noise, it is desirable to determine the contents of the memory unit during a period when the memory is relatively quiescent. However, the period of time for interrogation of the quiescent semiconductor memory unit typically does not coincide with the period time during which the contents of the memory unit must be available to the data processing unit. Therefore during a period of relative inactivity, it is desirable to sample the content of a memory cell, providing that at a later period, the result of the sampling is still available to the associated circuits. Then the information is removed in preparation for future sampling of the memory cell.

A further problem arises because the levels of the binary signals available from the MOSFET memory cells are typically separated by approximately 20 Volts while the remainder of the data processing system have levels of the binary signals separated by less than 4 Volts. In addition, the output of a MOSFET unit is typically considered an equivalent current source, while the associated transistor-transistor-logic (TTL) circuits are responsive to equivalent voltage sources. The MOSFET output signal is also temperature dependent. It is therefore necessary to convert the binary signals of the MOSFET memories to signals compatible with the requirements of the remainder of the system.

A final problem results when the output signals of several converter circuits are connected to a common terminal, such as a data bus. To eliminate the resulting noise, it is necessary to isolate electrically the undesired electrical signals from the common terminal while maintaining the availability of the desired electrical circuit.

Therefore, it is an object of the present invention to provide an improved converter circuit for transferring information from a memory cell to a data processing unit while minimizing the noise of the memory array.

It is another object of the present invention to provide an improved circuit for converting the signals available from a MOSFET memory unit to signals suitable for manipulation by TTL circuits.

It is a further object of the present invention to be responsive to the output signals of elements of the memory array during a period when the memory array is relatively noise-free.

A more specific object of the present invention is to store the result obtained from the memory array, the stored result being unaffected by the memory array after the period of responsiveness to the memory output signal.

It is a final object of the present invention to isolate electrically the output terminal during such time as the result of the associated memory unit is not required by the data processing unit.

SUMMARY OF THE INVENTION

The aforesaid objects of the invention are accomplished by an electronic converter circuit providing for the reduction noise inherent in a MOSFET memory array by having a network responsive to the output signals of a MOSFET memory cell, a network enabling the converter circuit to be responsive to the output signals of the memory cell during a relatively noise-free period of the memory array, a network for maintaining the output signal of the converter circuit once that signal is established by the memory cell, a network for clearing the maintained output signal from the inverter circuit, and a network for electrically isolating the converter signal output from the output terminal.

An input or converter network responds to an input current signal providing a voltage signal at the output terminal of the network. Temperature variations of the current input from the semiconductor memory cell are compensated for in the converter network. To improve the response time, the voltage signals at the output of the converter network are smaller than the voltage signals of the TTL circuits.

An enabling network allows the voltage signal at the output of the converter network to be transmitted to output of the converter circuit when an enabling signal is applied to the converter network. The enabling signal is applied during a noise free period of the memory cell.

A storage network maintains the inverter circuit output signal, once this signal is transmitted by the enabling circuit. The maintained output signal is cleared by an external signal applied to the storage network.

A final network is provided for electrically isolating the signals of the converter circuit from the output terminal. Thus several converter circuits are coupled to a common terminal (or bus) and the undesired signals are isolated from the common terminal, in response to external signals, by the final network of each converter circuit.

DESCRIPTION OF THE PREFERRED EMBODIMENT

Figure 1:
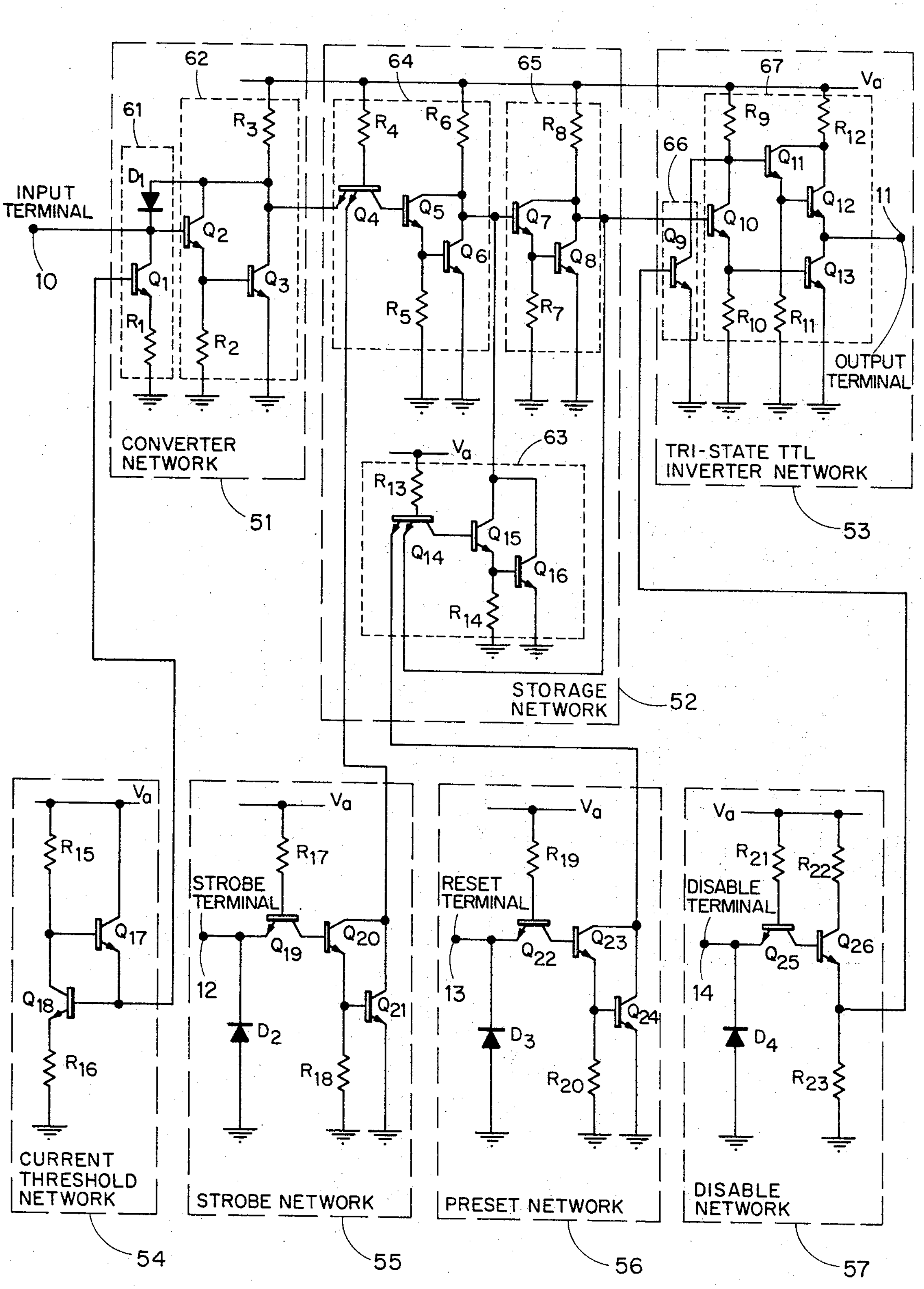
FIG. 1, is a schematic circuit diagram of the preferred embodiment of the converter circuit.

Detailed Description of FIG. 1

Referring now to FIG. 1, Input Terminal 10 is coupled to the collector of transistor $Q_1$, the base of transistor $Q_2$ and the cathode of diode $D_1$. The emitter of transistor $Q_1$ is coupled, through resistor $R_1$, to ground potential. The emitter of transistor $Q_2$ is coupled to the base of transistor $Q_3$ and is coupled through resistor $R_2$ to ground potential, while the collector of transistor $Q_3$ is coupled to a first emitter of multi-emitter transistor $Q_4$, the collector of transistor $Q_2$, the anode of diode $D_1$ and through resistor $R_3$ to the power supply $V_a$. The emitter of transistor $Q_3$ is coupled to ground potential.

The base of transistor $Q_4$ is coupled through resistor $R_4$ to power supply $V_a$, while the collector of transistor $Q_4$ is coupled to the base of transistor $Q_5$. The emitter of transistor $Q_5$ is coupled to the base of transistor $Q_6$ and through resistor $R_5$ to ground potential. The collector of transistor $Q_5$ is coupled to the collector of transistor $Q_6$, the base of transistor $Q_7$, the collector of transistor $Q_{15}$, the collector of transistor $Q_{16}$ and, through resistance $R_6$, to power supply $V_a$. The emitter of transistor $Q_6$ is coupled to ground potential. The emitter of transistor $Q_7$ is coupled to the base of transistor $Q_8$ and through resistance $R_7$ to ground potential. The collector of transistor $Q_7$ is coupled to the collector of transistor $Q_8$, the base of transistor $Q_{10}$, a first emitter of multi-emitter transistor $Q_{14}$ and, through resistor $R_8$, to power supply $V_a$. The emitter of transistor $Q_8$ is coupled to ground potential.

The emitter of transistor $Q_{10}$ is coupled to the base of transistor $Q_{13}$ and is coupled through resistance $R_{10}$ to ground potential. The collector of transistor $Q_{10}$ is coupled to the collector of transistor $Q_9$, the base of transistor $Q_{11}$ and through resistor $R_9$ to the power supply $V_a$. The emitter of transistor $Q_9$ is coupled to ground potential. The collector of transistor $Q_{11}$ is coupled to the collector of transistor $Q_{12}$ and, through resistor $R_{12}$, to power supply $V_a$. The emitter of transistor $Q_{11}$ is coupled to the base of transistor $Q_{12}$ and, through resistor $R_{11}$ to ground. The emitter of transistor $Q_{12}$ is coupled to output terminal 11 and to the collector of transistor $Q_{13}$. The emitter of transistor $Q_{13}$ is coupled to ground potential.

The emitter of transistor $Q_{15}$ is coupled to the base of transistor $Q_{16}$ and, through resistor $R_{14}$, to ground potential. The emitter of transistor $Q_{16}$ is also coupled to ground potential. The base of transistor $Q_{15}$ is coupled to the collector of multi-emitter transistor $Q_{14}$. The base of multi-emitter transistor $Q_{14}$ is coupled to power supply $V_a$ through resistor $R_{13}$.

The base of transistor $Q_1$ is coupled to the base of transistor $Q_{18}$ and the emitter of transistor $Q_{17}$. The collector of transistor $Q_{17}$ is coupled to power supply $V_a$. The base of transistor $Q_{17}$ is coupled to the collector of transistor $Q_{18}$ and, through resistor $R_{15}$, to power supply $V_a$. The emitter of transistor $Q_{18}$ is coupled to ground potential through resistor $R_{16}$.

The second emitter of multi-emitter transistor $Q_4$ is coupled to the collector of transistor $Q_{20}$ and the collector of transistor $Q_{21}$. The emitter of transistor $Q_{21}$ is coupled to ground potential, while the base of transistor $Q_{21}$ is coupled to the emitter of transistor $Q_{20}$ and to ground potential through resistor $R_{18}$. The base of transistor $Q_{20}$ is coupled to the collector of transistor $Q_{19}$. The base of transistor $Q_{19}$ is coupled through resistor $R_{17}$ to power supply $V_a$ while the emitter of transistor $Q_{19}$ is coupled to Strobe Terminal 12 and to the cathode of diode $D_2$. The anode of diode $D_2$ is coupled to ground potential.

The second emitter of multi-emitter transistor $Q_{14}$ is coupled to the collector of transistor $Q_{23}$ and the collector of transistor $Q_{24}$. The emitter of transistor $Q_{24}$ is coupled to ground potential, while the base of transistor $Q_{24}$ is coupled to the emitter of transistor $Q_{23}$ and, through resistor $R_{20}$, to ground potential. The base of transistor $Q_{23}$ is coupled to the collector of transistor $Q_{22}$. The base of transistor $Q_{22}$ is coupled to power supply $V_a$ through resistor $R_{19}$, while the emitter of transistor $Q_{22}$ is coupled to Preset Terminal 13 and the cathode of diode $D_3$. The anode of diode $D_3$ is coupled to ground potential.

The base of transistor $Q_9$ is coupled to the emitter of transistor $Q_{26}$ and through resistor $R_{23}$ to ground potential. The collector of transistor $Q_{26}$ is coupled to power supply $V_a$ through resistor $R_{22}$, while the base of transistor $Q_{26}$ is coupled to the collector of transistor $Q_{25}$. The base of transistor $Q_{25}$ is coupled through resistor $R_{21}$ to power supply $V_a$ while the emitter of transistor $Q_{25}$ is coupled to Disable Terminal 14 and to the cathode of diode $D_4$. The anode of diode $D_4$ is coupled to ground potential.

This circuit may be realized either through the use of discrete components or through the use of integrated circuit techniques. In the preferred embodiment the following values have been selected for the resistors: $R_{15}$ is $12 \times 10^3\Omega$; $R_2$, $R_4$, $R_{11}$, $R_{13}$, $R_{17}$, $R_{19}$, and $R_{21}$ are $4 \times 10^3\Omega$; $R_3$, $R_6$, and $R_8$ are $2 \times 10^3\Omega$; $R_5$, $R_7$, $R_9$, $R_{14}$, $R_{18}$, $R_{20}$, and $R_{22}$ are $1 \times 10^3\Omega$; $R_{10}$, and $R_{23}$ are $500\Omega$; $R_{12}$ is $120\Omega$; and $R_1$ and $R_{16}$ are $50\Omega$. However other values may be selected for these resistors. The power supply $V_a$ maintains a potential of +5 volts relative to ground in the preferred embodiment, however, other values of potential may be used.

Operation of the Preferred Embodiment

Figure 2:
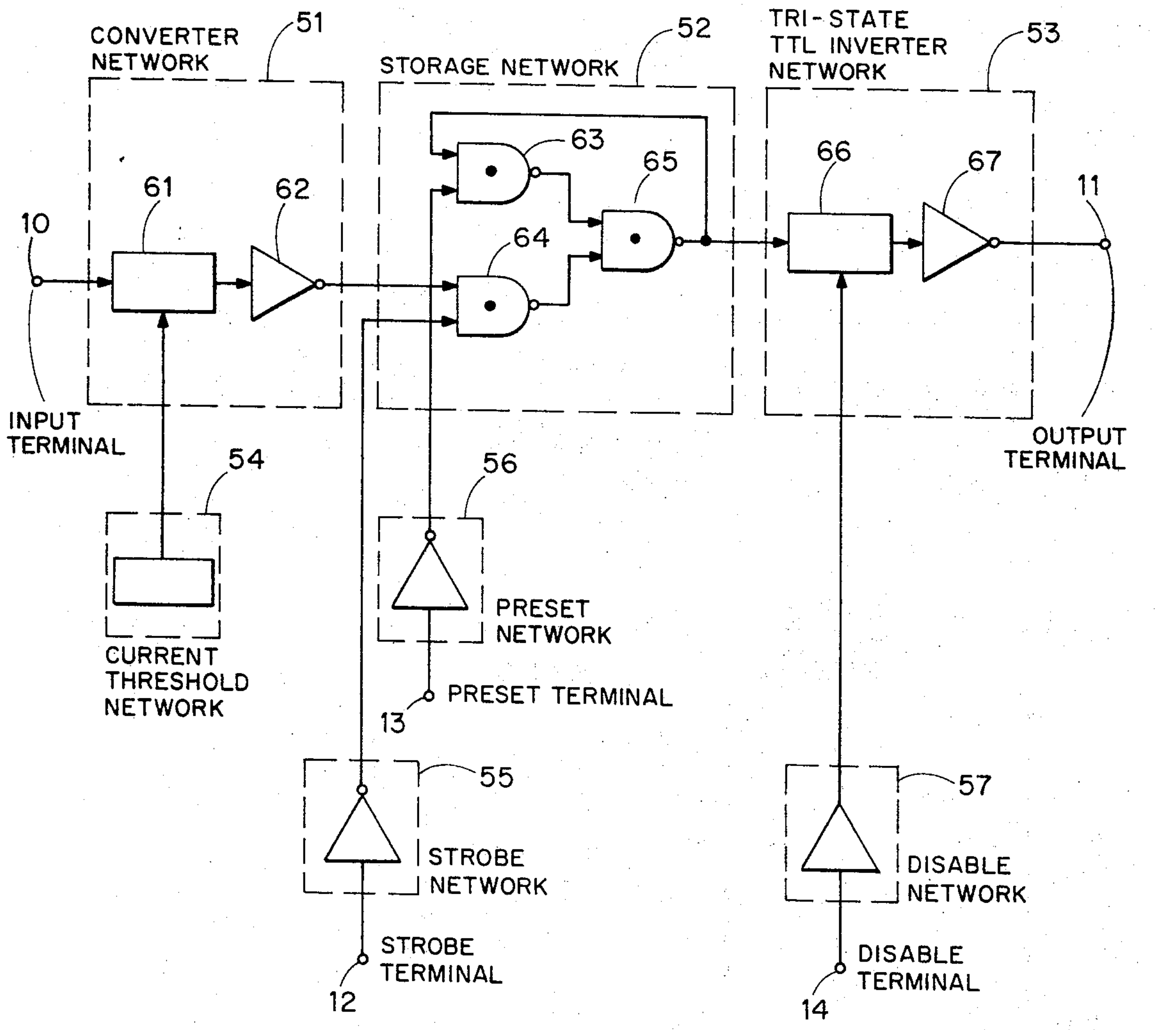
FIG. 2, is a block diagram of the preferred embodiment of the invention shown in FIG. 1.

Referring again to FIG. 1, the elements of the Converter Circuit are divided into several networks. These networks are labelled Converter Network 51, Storage Network 52, Tri-State TTL Inverter Network 53, Current Threshold Network 54, Strobe Network 55, Preset Network 56 and Disable Network 57. The operation of the Converter Circuit is understood by comparing the circuit diagram of FIG. 1 with the schematic block diagram of FIG. 2.

Converter Network 51 is comprised of a Current Sensing Component 61 and an Inverting Amplifier 62. The output of a MOSFET memory element is a current source (of about 0.6ma in the preferred embodiment). The Converter Network transforms a current input signal applied to Input Terminal 10 into a voltage output signal of the Converter Network. Transistor $Q_1$, and diode $D_1$ comprise the Component 61. Transistor $Q_{18}$ provides a modified diode-biasing of Transistor $Q_1$, (cf. An Outline of Design Techniques for Linear Integrated Circuits, H.R. Camenzind and A.B. Grebene, *IEEE Journal of Solid-State Circuits* pages 110–122, Vol. SC–4 No. 3 1969), and transistor $Q_{17}$ supplies the base current for Transistors $Q_{18}$ and $Q_1$. The collector current of Transistor $Q_1$ is maintained approximately at a constant value. The current conducted through transistor $Q_1$, and consequently the voltage of the base of transistor $Q_2$ are maintained at a nearly constant value by the Current Threshold Network 54 as long as current is conducted through diode $D_1$. Current introduced into Input Terminal 10 for conduction through transistor $Q_1$ replaces current flowing through diode $D_1$. Above a threshold value (of 0.3ma) for current flowing into Input Terminal 10, diode $D_1$ is no longer conducting and the voltage of the base of transistor $Q_2$ rises. The change in voltage at the base of $Q_2$ is amplified and inverted by transistors $Q_2$ and $Q_3$ (comprising Inverting Amplifier 62) so that the potential of the collector of transistor $Q_3$ falls from approximately 2 volts to 1 volt. (To facilitate discussions the higher of two voltage levels will be referred to as a logic 1 signal, while the lower of the two voltage levels will be referred to as the logic 0 signal even though the levels are not voltage levels usually given those designations or even the same levels as in other parts of the converter circuit.) Current less than 0.3ma is applied to Input Terminal 10 for a logic 0 signal. Converter Circuit 51 thus both inverts the logic signals and provides a voltage output. The reduced magnitude of the voltage change at the output of the Converter Circuit compared to standard TTL circuit voltage levels improves the response time of the network. The requirement of a threshold current producing the change of the output signal of the Converter Network provides one method of discrimination against noise in the MOSFET device.

Converter Network 51 is coupled to Storage Network 52, Storage Network 52 is comprised of logic "NAND" gate 64, logic "NAND" gate 63 and logic "NAND" gate 65. The output signals of gate 64 and gate 63 are applied to separate input terminals of gate 65. The logic "NAND" gate 64 is comprised of a multi-emitter transistor $Q_4$ and the transistor amplifier pair $Q_5$ and $Q_6$. Logic "NAND" gate 63 is comprised of a multi-emitter transistor $Q_{14}$ and the transistor amplifier pair $Q_{15}$ and $Q_{16}$. Logic "NAND" gate 65 is comprised of the transistor pair $Q_7$ and $Q_8$. The output signal from Converter Network 51 is applied to one input terminal of gate 64. The second input terminal of "NAND" gate 64 is coupled to the output terminal of Strobe Network 55. Strobe Network 55 is an inverting amplifier comprising transistors $Q_{19}$, $Q_{20}$ and $Q_{21}$. Because Strobe Network 55 is an inverting amplifier, logic 0 signal applied to Strobe Terminal 12 results in an enabling logic 1 signal being applied to gate 64, while a logic 1 signal applied to Strobe Terminal 12 disables gate 64. Therefore a logic 1 signal from the Converter Network results in a logic 0 signal at the output terminal of gate 64 when a logic 0 signal is applied to Strobe Terminal 12. If a logic 0 signal is applied to either of the output terminals of gate 63 or gate 64, the output terminal of logic "NAND" gate 65 has a logic 1 signal applied to it. The output signal of gate 65 is applied to one input terminal of gate 63. The second input terminal of gate 63 is coupled to Preset Network 56. Preset Network 56, comprising transistors $Q_{22}$, $Q_{23}$ and $Q_{24}$ , is an inverting amplifier which, in response to a logic 0 signal applied to Preset Terminal 13, applies an enabling logic 1 signal to gate 63. Thus, a logic 1 signal applied to the output terminal of gate 65, and consequently to the output terminal of Storage Network 52, is maintained by the recirculation path, including gate 63, as long as an enabling signal is received by gate 63 from Preset Network 56.

The output terminal of Storage Network 52 is coupled to the Tri-State TTL Inverter Network 53. Inverter Network 53 is comprised of an Inverting Amplifier 67, including transistors $Q_{10}$, $Q_{11}$, $Q_{12}$ and $Q_{13}$ and a Switch 66, including transistor $Q_9$. The output terminal of Inverting Amplifier 67 is coupled to Output Terminal 11. The Switch 66 is coupled to Disable Network 57. Disable Network 57 is an amplifier comprising transistors $Q_{25}$ and $Q_{26}$. A logic 1 signal applied to Disable Terminal 14 or an electrically disconnected or "floating" Disable Terminal 14 results in a logic 1 signal being applied to Switch 66. Switch 66 is thus actuated and results in the output terminal of Inverting Amplifier 67 being electrically isolated from the input signals to Inverter Network 53. Furthermore, activation of Switch 66 causes the output terminal of Inverting Amplifier 67 to become an electrically "floating" terminal, and as such, does not affect the potential experienced by Output Terminal 11. Thus the Output Terminal 11, which is coupled to the output terminal of Inverting Amplifier 67, is unaffected by the Converter Circuit, when a logic 1 signal is applied to Inverter Network 53 by Disable Network 57. The operation of networks similar to Inverter Network 53 is discussed in the National Semiconductor corporation Digital Integrated Circuit Catalog, May, 1971 at page XII and XIII.

Thus with the proper application of external control signals, a logic 0 signal applied to Input Terminal 10 will result in a logic 0 signal being applied to Output Terminal 11. Otherwise a logic 1 is present at Terminal 11. The voltage levels of logic 0 signal and logic 1 signal of Output Terminal 11 corresponds to typical TTL voltage levels. If the Inverter Network 53 is disabled, the state of the Converter Circuit does not affect the potential of Output Terminal 11.

Figure 3:
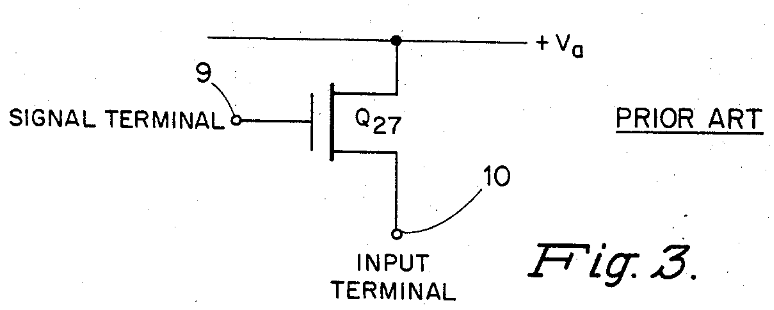
FIG. 3, is a schematic circuit diagram of a prior art field-effect-transistor (FET) device which provides the input signals to the converter circuit in the preferred embodiment of the invention.

FIG. 3 shows a schematic diagram of the MOSFET element of the preferred embodiment, and the connection to the Converter Circuit. The signal levels applied to Signal Terminal 9 are 5 Volts (i.e., $V_a$) and −14.3 Volts, although other values may be used. In the present embodiment $Q_{27}$ is a *p*-channel MOSFET device so that 5 Volts applied to Terminal 9 maintains $Q_{27}$ in a non-conducting state, while −14.3 Volts applied to Terminal 9 results in a current source of 0.6ma being applied to Input Terminal 10.

The MOSFET device is affected by temperature. In the preferred embodiment the current from $Q_{27}$ drops by 7 percent for a temperature rise of 50°C. It is found that the temperature variation of $R_{15}$ causes the threshold current to fall while the temperature variation of the base-emitter voltage of $Q_{18}$ causes the threshold current to rise. The temperature variation of the current of transistor $Q_{27}$ is compensated by the combined temperature variations of the resistance of resistance $R_{15}$ and of the base-emitter voltage of transistor $Q_{18}$. Thus where the current available from $Q_{27}$ decreases (increases) the threshold value for activation of the Converter Network decreases (increases) in an approximately proportionate amount.

Similarly an increase (decrease) in the voltage of power supply $V_a$ causes an increase in the current delivered by transistor $Q_{27}$ to the Input Terminal 10. But an increase (decrease) in power supply voltage $V_a$ causes the Current Threshold Network 57 to require an increased (decreased) threshold current to activate Converter Network 51.

The above description along with the numerical values is included for illustration of the operation of the preferred embodiment and is not meant to limit the scope of the invention. The scope of the invention is limited only by the following claims. A person skilled in the art can discern many changes and variations in the above description which are yet within the spirit and scope of the invention.

What is claimed is:

1. An electronic converter circuit for converting the signals from a MOSFET memory unit (a MOS circuit signal) to signals suitable for processing by TTL circuits (a TTL circuit signal) comprising:

a converter network for converting said MOS circuit signal into a converter signal;

a storage network coupled to said converter network for establishing and maintaining a storage signal in response to said converter signal, said storage network being enabled to respond to said converter signal by a first control signal, said storage network being enabled for maintaining said storage signal by a second control signal; and an output network coupled to said storage network, for establishing an output signal in response to said storage signal, said output network responsive to a third control signal for electronically isolating said storage signal from an output terminal of said electronic converter circuit.

2. An electronic converter circuit of claim 1 further comprising:

a threshold network coupled to said converter network for converting said MOS circuit signal into said converter signal when said MOS circuit signal exceeds a threshold value.

3. The electronic converter circuit of claim 2, wherein said storage network comprises a first logic "NAND" circuit, a second logic "NAND" circuit and a third logic "NAND" circuit, said third logic "NAND" circuit coupled to said first logic "NAND" circuit, said second logic "NAND" circuit, and said output network, said first logic "NAND" gate being coupled to said converter network, said storage signal being applied to an output terminal of said third logic "NAND" gate in response to said converter signal and said first control signal being applied to input terminals of said first logic "NAND" circuit, said storage signal being maintained at said output terminal of said third logic "NAND" circuit in response to said second control signal being applied to an input terminal of said second logic "NAND" gate.

4. The electronic converter circuit of claim 3 wherein said first "NAND" circuit and said second "NAND" circuit comprise multi-emitter transistor gates and first inverting transistor amplifying pairs, and wherein said third "NAND" circuit comprises a second inverting transistor amplifying pair.

5. An electronic converter circuit for producing TTL circuit signals in response to MOS circuit signals comprising:

a converter network for converting an MOS input current signal to a converter signal voltage, a storage network coupled to said converter network, wherein said storage network includes:

controllable amplifying means for applying a storage signal at an output terminal of said storage network in response to said converter signal, enabling means, coupled to said amplifying means, for enabling said amplifying means in response to a first external signal, storage means, coupled to said amplifying means for maintaining said storage signal in response to a second external signal, and an output network coupled to said storage network for producing an output signal at an output terminal to said storage signal, said output network including a disable means for electrically isolating said output terminal from said storage signal in response to a third external signal.

6. The electronic converter circuit of claim 5 further comprising:

a threshold network coupled to said converter network producing a change in said converter signal voltage, when said MOS input signal exceeds a threshold value.

7. The electronic converter circuit of claim 6 wherein said first external signal is applied during a period of electrical inactivity of an MOS circuit producing said MOS input signals.

8. An electronic converter circuit for producing a TTL circuit signal in response to an MOS circuit signal from a MOS memory unit comprising:

means for converting an input current signal into a converter voltage signal;

means for storing said converter voltage signal coupled to said converter means and adapted to receive a first control signal, said storage means storing said converter voltage signal in response to said first control signal;

means for clearing said converter voltage signal from said storage means in response to a second control signal, said storage means maintaining said converter voltage signal during an absence of said second control signal; and output means coupled to said storage means adapted to receive a third control signal, said output means establishing said TTL circuit signal at an output terminal of said output means in response to said converter voltage signal stored in said storage means, said converter voltage signal being isolated from said output terminal in response to said third control signal.

9. The electronic converter circuit of claim 8 wherein said MOS circuit signal is derived from an MOS memory cell, and wherein said first control signal is applied during a period of inactivity of said MOS memory cell.

10. The electronic converter circuit of claim 9, further comprising means for establishing a threshold signal level coupled to said converter means producing said converter voltage signal, when said input current signal exceeds a threshold value.

11. An electronic converter circuit for producing TTL circuit signals in response to MOS circuit signals comprising:

a converter network including an input current threshold network and a first amplifying network, said threshold network coupled to said first amplifying network, said converter network causing an output signal of said first amplifying network in response to an input current above a specified value;

a storage network including a first logic "NAND" circuit, a second logic "NAND" circuit and a third logic "NAND" circuit, said first amplifying network coupled to a first input terminal of said first "NAND" circuit, said first "NAND" circuit adapted to receive a first control signal applied to a second input terminal, wherein an output terminal of said first "NAND" circuit is coupled to a first input terminal of said second "NAND" circuit, wherein an output terminal of said third "NAND" circuit is coupled to a second input terminal of said second "NAND" circuit, wherein an output terminal of said second "NAND" circuit is coupled to a first input terminal of said third "NAND" circuit wherein said third "NAND" circuit is adapted to receive a second control voltage applied to a second input terminal, wherein a storage signal at said output terminal of said second "NAND" circuit is established in response to said output signal of said first amplifying network and said first control signal, and wherein said storage signal is maintained at said output terminal of said second "NAND" circuit in response to said second control signal; and an output network, including a switching network and a second amplifying network, said second amplifying network coupled to said switching network, said switching network coupled to said output terminal of said second "NAND" circuit wherein an output signal applied to a converter circuit output terminal by said second amplifying network in response to said storage signal, said switching network adapted to receive a third control signal, said third control signal causing said switching network to electrically isolate a signal from said converter circuit output terminal from an output terminal of said output network.

12. The electronic converter circuit of claim 11 wherein said first "NAND" circuit and said third "NAND" circuit are comprised of multi-emitter transistor gates and inverting transistor amplifying pairs and said second "NAND" circuit is comprised of an inverting transistor amplifying pair.

13. The electronic converter circuit of claim 12 wherein said input current threshold network comprises:

a transistor coupled to an input terminal of said converter circuit, a diode coupled to said transistor, an amplifying transistor pair coupled to said transistor, said amplifying pair maintaining a voltage level at a collector of said transistor constant so long as current in said transistor is below said specified value, said current in said transistor supplied by the sum of current in said diode and current applied to said input terminal of said converter circuit.

14. The electronic converter circuit of claim 13 wherein said MOS circuit consists of a MOSFET device and wherein said input current threshold network further comprises a resistor coupled to said amplifying transistor pair, wherein thermal characteristic of said resistor and a first transistor of said amplifying transistor pair compensate thermal characteristic of said MOSFET device.

15. The electronic converter circuit of claim 14 wherein said input current threshold network causes a change in said specified value to compensate for a change of current from said MOSFET device due to variation of a power supply.

16. A method of converting the output signal of an MOS memory cell to a circuit signal comprising:

converting said output current signal of said memory cell into a voltage signal at an output terminal of a converter network;

establishing a storage signal in a storage network coupled to said converter network, said storage signal established in response to said voltage signal of said converter circuit, said storage network responsive to a first control signal for enabling said storage signal to be established;

maintaining said storage signal in said storage network in response to a second control signal applied to said storage network;

establishing said circuit signal at an output terminal of an output network, said output network coupled to said storage network and said circuit signal determined by said storage signal; and isolating electrically said output terminal from said storage signal in response to a third control signal.

* * * * *